UNITED STATES PATENT OFFICE.

WILLIAM B. SCHUYLER, OF SAN FRANCISCO, CALIFORNIA.

SELF-RISING RICE PANCAKE-FLOUR.

1,263,609.

Specification of Letters Patent. Patented Apr. 23, 1918.

No Drawing. Application filed February 21, 1918. Serial No. 218,441.

*To all whom it may concern:*

Be it known that I, WILLIAM B. SCHUYLER, a citizen of the United States, residing at San Francisco, in the county of San Francisco and State of California, have invented new and useful Improvements in Self-Rising Rice Pancake-Flour, of which the following is a specification.

The object of the present invention is to provide an improved self-rising rice pancake flour.

In preparing my improved pancake flour I take 20 lbs. of wheat flour; $22\frac{1}{2}$ lbs. of bolted rice flour; $22\frac{1}{2}$ lbs. of ground rice bran; $22\frac{1}{2}$ lbs. of rice polish; 10 lbs. of soy bean flour; 2 lbs. of salt; and $\frac{1}{2}$ lb. of baking powder.

Instead of rice flour I may use about 15 lbs. more of wheat flour, the proportions of the other ingredients being proportionately increased to make 100 lbs. in all of the mixture. The wheat flour supplies the necessary gluten, and the rice bran and rice polish the necessary flavor to make the pancake a balanced food.

These ingredients are all thoroughly mixed together and used in the ordinary manner of using pancake flour.

Pancakes made of this mixture are very nutritious and have an excellent flavor.

I claim:—

1. Self-rising pancake flour comprising wheat-flour, bolted rice flour, ground rice bran, rice polish, soy bean flour, salt and baking powder substantially in the proportions specified.

2. Self-rising pancake flour comprising wheat-flour, ground rice bran, rice polish, soy bean flour, salt and baking powder substantially in the proportions specified.

WM. B. SCHUYLER.